A. L. BERTHELSEN.
TRACTOR TREAD.
APPLICATION FILED SEPT. 3, 1919.
1,381,857.
Patented June 14, 1921.
2 SHEETS—SHEET 1.
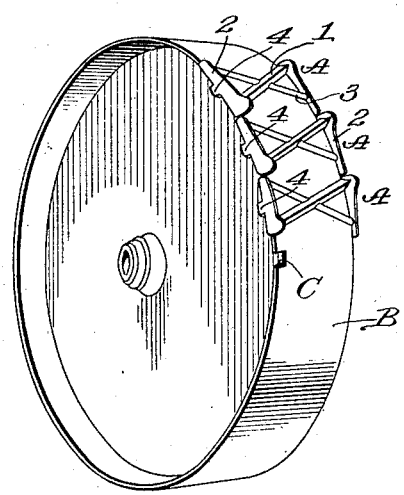
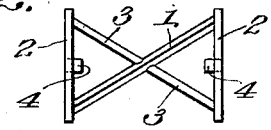
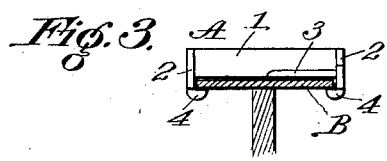
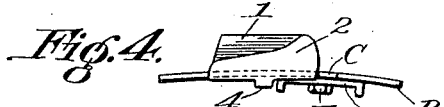
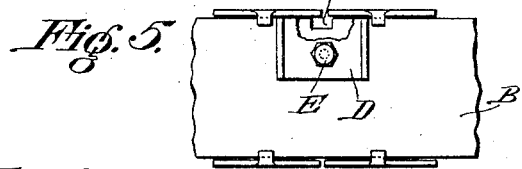
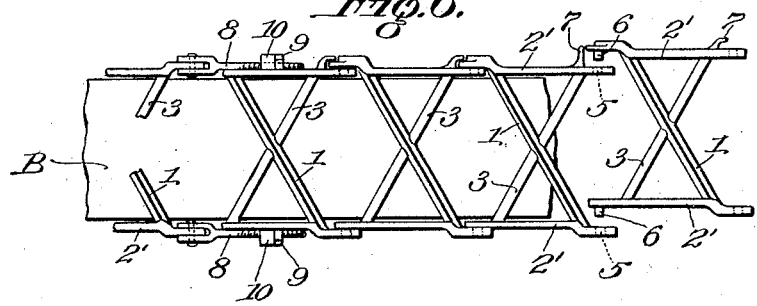
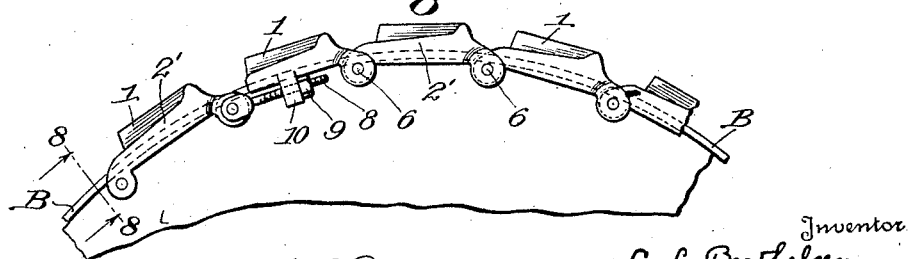
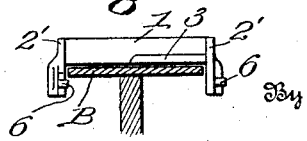
Inventor
A. L. Berthelsen
By Robb & Robb
Attorneys

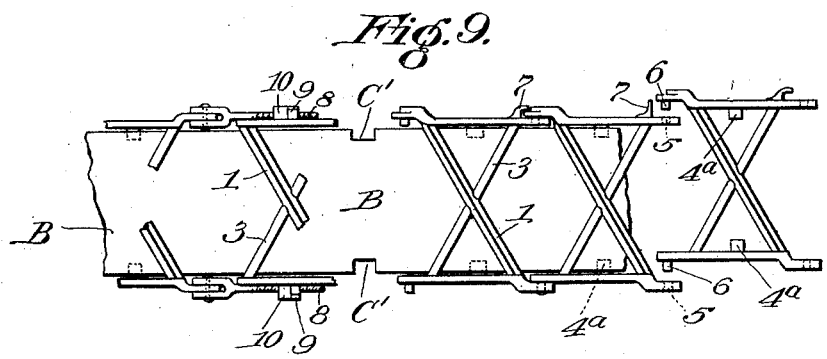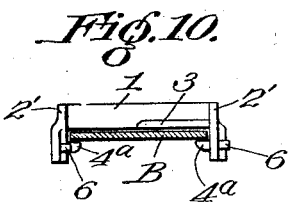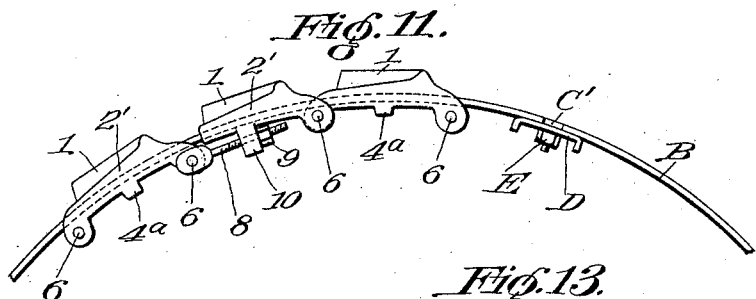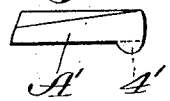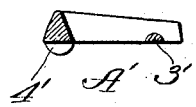

UNITED STATES PATENT OFFICE.

ANDERS L. BERTHELSEN, OF CHICAGO, ILLINOIS, ASSIGNOR TO HENRY MORTON, OF CHICAGO, ILLINOIS.

TRACTOR-TREAD.

1,381,857.  Specification of Letters Patent.  Patented June 14, 1921.

Application filed September 3, 1919. Serial No. 321,378.

*To all whom it may concern:*

Be it known that I, ANDERS L. BERTHELSEN, a subject of the King of Denmark, residing at Chicago, in the county of Cook and State of Illinois, have invented certain new and useful Improvements in Tractor-Treads, of which the following is a specification.

The present invention relates to improvements in tractor treads and is designed particularly with a view to provide simple and effective means for application to tractor wheels without material alterations in the wheel construction itself and of a character which will promote facility of attachment or detachment.

To fully comprehend the objects of this invention it may be noted that owing to the damage which is occasioned by the travel of heavy vehicles or machines of this type over the highways, in many localities laws have been enacted which prohibit the movement of these vehicles upon the roads when equipped with projections or lugs, and with this in mind the problem has been to devise antislipping or traction means which may be applied to those wheels not originally supplied with anti-slipping devices or which when provided will be easy to remove when about to move over a road surface.

Among other objects of my invention of equal importance are first, the provision of a tread composed of a series of rim engaging members which are so constructed and arranged that the wheel will ride smoothly from one on to another, and second, the provision of a construction of individual tread members which will withstand the strain applied thereto under ordinary conditions of use.

These and such other objects as may hereinafter appear are attained by the novel construction, combination and arrangement of parts to be hereinafter specifically described and claimed. Reference will now be had to the accompanying drawings forming a part of this specification, wherein:

Figure 1 is a perspective view of a tractor wheel having several of the tread members applied thereto.

Fig. 2 is a plan view of one form of tread member.

Fig. 3 is a fragmentary transverse sectional view of the tractor wheel showing the tread member in side elevation.

Fig. 4 is a fragmentary view of the wheel rim showing the tread member in end elevation and the locking means on the rim.

Fig. 5 is a plan view of a portion of the wheel rim at the point where the locking member for the tread member is disposed.

Fig. 6 is a plan view of a modified type of tread member showing the method of connecting the series of tread members together.

Fig. 7 is a side elevation of a portion of the wheel having tread members of the type shown in Fig. 6 applied thereto.

Fig. 8 is a sectional view on the line 8—8 of Fig. 7.

Fig. 9 is a view similar to Fig. 6, showing a slightly modified form of the tread member disclosed in said figure.

Fig. 10 is a sectional view of the rim showing the tread member of Fig. 9 in side elevation.

Fig. 11 is a fragmentary view of the rim showing the tread members depicted in Fig. 9, in end elevation.

Fig. 12 is a sectional view through a still further modified form of tread member.

Fig. 13 is an end elevation thereof.

Throughout the following detail description and on the several figures of the drawings, similar parts are referred to by like reference characters.

Referring to the drawings, and in particular to Figs. 1 to 5 thereof, it will be observed that the invention comprehends provision of a series of detachable tread members designated generally by the reference character A. With this type of tread member the tractor wheel B is provided with a notch C in one edge of its rim and with a locking plate D which coöperates therewith, being removably held in place by means of a fastening member or bolt E.

With reference to the specific construction of the tread member itself, it will be observed that it comprises a relatively heavy transverse rib 1 which rib is preferably arranged to extend in a diagonal direction across the rim and to connect with the ends of the side plates or members 2. As will be apparent from Figs. 3 and 4, the side plates coact with the edges of the rim of the wheel and are designed to prevent any tendency of the tread member to twist. In addition, brace arms 3 in alinement with each other connect with the opposite ends of the side plates 2, these arms being preferably in alinement with each other so as to intersect the rib 1 about midway of its length. With this form of brace the tread member is quite substantial for the purpose for which it is designed and the construction above referred to is common to all of the types of tread members herein disclosed. Each of the side members 2 is formed with an integral depending lug 4 which engages beneath the rim of the wheel and holds the tread member from displacement from said rim. It should be borne in mind as an important phase of this arrangement of tractor tread that the individual tread members have a certain freedom of movement with respect to each other, so that they tend to knock against one another during the rotation of the wheel and thereby dislodge any soil which tends to cling to the brace arms and rib or to the surface of the wheel between the tread members. The provision of the notch C permits the tread members A to be attached and detached from position through the instrumentality of the removable plate D. This plate serves a dual function also in that it prevents circumferential movement of the tread members in excess of the slight relative movement hereinbefore referred to.

In the tread member shown in Figs. 12 and 13 and designated A' the only modification which I have introduced is with respect to the disposition of the rim engaging lug 4', the latter being arranged at the end of each side member instead of midway as in the form shown in Figs. 1 to 5.

Referring now to Figs. 6 and 7, the type of tread member is modified to the extent of providing means for connecting the tread members to each other so that they will form substantially an endless chain about the wheel. To this end the corresponding ends of each side member 2' of a particular tread member are provided with openings 5 to receive offstanding pivot lugs 6 of the adjacent tread member, Fig. 6 clearly depicting the manner in which the tread members are assembled with respect to each other. At one side each tread member is formed with an offstanding bendable lug 7 which when the adjacent tread member is disposed in place as just described is bent over the contiguous extremity of the side member 2' to thereby to hold the lugs 6 within their respective apertures. A pivotal connection between the tread members is thus provided while the series of tread members constituting the chain are joined together by means of the connecting bolts 8 and the adjusting nuts 9, the former extending through apertured lugs or eyes 10 on one of the connecting links or tread members.

The type of tread member which is disclosed in Figs. 9 to 11 differs from that depicted in Figs. 6 to 8 only in that each tread member is provided with a rim engaging lug 4ª, as shown in the construction of tread member in Fig. 1. The purpose of providing the rim engaging members in this form is to prevent the displacement or loss of the tread members in the event of the breakage of the connection of one tread member with another. It will be obvious, of course, that the rim of the wheel when provided with this form of tread member, is suitably notched as indicated at C' to enable the tread members to be disposed in position upon the rim.

In respect to all of the types of tread members hereinbefore described, it should be observed that the distance between the transverse planes passing through the adjacent ends of a pair of tread members is considerably less than the length of a particular tread member. The purpose of thus arranging or constructing the tread members so that the ribs 1 thereof are parallel with each other and thus closely spaced, is to provide for riding smoothly from one rib to the next adjacent rib during rotation of the wheel, thus eliminating a great amount of vibration when running over hard surfaces.

It will be observed that the tractor tread hereinbefore described may easily be applied to a wheel or displaced therefrom and it is within the purview of this invention to comprehend slight changes in the details of construction without in any way departing from the spirit of the invention and within the scope of the claims hereto appended.

Having thus described my invention, what I claim as new is:

1. A tractor tread member or lug for vehicle wheels comprising spaced side members, a transversely arranged relatively heavy rigid rib joined at an acute angle to opposite ends of said side members, and means engageable with the edge of the wheel rim for holding the tread members against displacement.

2. A tractor tread composed of a plurality of tread member units removably mounted upon a wheel rim, each unit comprising a transversely arranged rib extending substantially the entire width of the rim, side members engageable with the edges of the rim to prevent twisting of the member and providing means for spacing said tread members, and a brace intermediate the said side members and the rib.

3. A tractor tread member or lug comprising a relatively heavy transversely arranged rib, spaced side members to opposite ends of which the rib connects, said members coacting with the rim substantially the length of the tread member, and brace means intermediate the said side members and the rib and intersecting the latter.

4. A tractor tread member or lug comprising a relatively heavy rib arranged to extend diagonally and unbrokenly across the rim of the wheel from side to side, side members extending substantially the length of the tread member and engageable with the side of the wheel, and oppositely arranged brace arms intermediate the said side members and the rib, said arms being in substantial alinement and connecting with the rib midway of its length.

5. A tractor tread member or lug comprising spaced side members for engagement with the edge of the rim of a tractor wheel and providing means for connecting one tread member with another, a transversely arranged relatively heavy rigid rib connecting the side members aforesaid, the surface contacting edge of the rib projecting substantially above the plane of the side members, and brace means intermediate the rib and said side members, the contacting edge of the rib also projecting above the plane of the brace means.

6. A tractor wheel tread composed of a series of tread members, each tread member being provided with side rim engaging elements, means pivotally connecting one tread member with another, and means for holding the tread members in a position preventing separation of the pivot connections.

7. A tractor wheel tread composed of a plurality of tread members, means connecting the tread members one to another, means preventing the separation of the connections, and separate means for holding the tread members in engaging relation upon the wheel rim.

8. A tractor wheel tread composed of a plurality of tread members, each tread member being provided with pivot projections and apertured ends to receive pivot projections of the next adjoining tread member, and a bendable projection adapted to coact with the end of the tread member having the pivot projections aforesaid to prevent displacement of said connection.

9. A tractor wheel tread composed of a plurality of tread members connected to form a continuous chain, means for connectting said chain members together about the periphery of the wheel and rim engaging means extending substantially the length of the tread members including extensions coacting with the edge of the rim for preventing displacement of the individual tread members in the event of breakage of connection between any of said tread members.

10. A tread member for tractor wheels comprising spaced side members provided with pivot projections and apertured ends to receive the pivot projections of the next adjoining member, a relatively heavy rigid rib connected to the opposite ends of said side members, a bracing member intermediate said side members and the rib, and means to engage with the rim of the wheel to prevent displacement of the tread member.

11. A tread member for tractor wheels comprising spaced side members provided with pivot projections and apertured ends to receive the pivot projections of the next adjoining member to connect the tread members in a continuous chain, a relatively heavy rigid rib joined to opposite ends of said side members, a bracing member intermediate said side members and the rib, means to engage with the rim of the wheel to prevent displacement of the tread members, and means to prevent displacement of the connection therebetween.

In testimony whereof I affix my signature.

ANDERS L. BERTHELSEN.